J. A. W. PINE.
PROCESS OF COATING MINERAL MATERIAL AND PRODUCT RESULTING THEREFROM.
APPLICATION FILED JULY 1, 1915.
1,343,680.
Patented June 15, 1920.
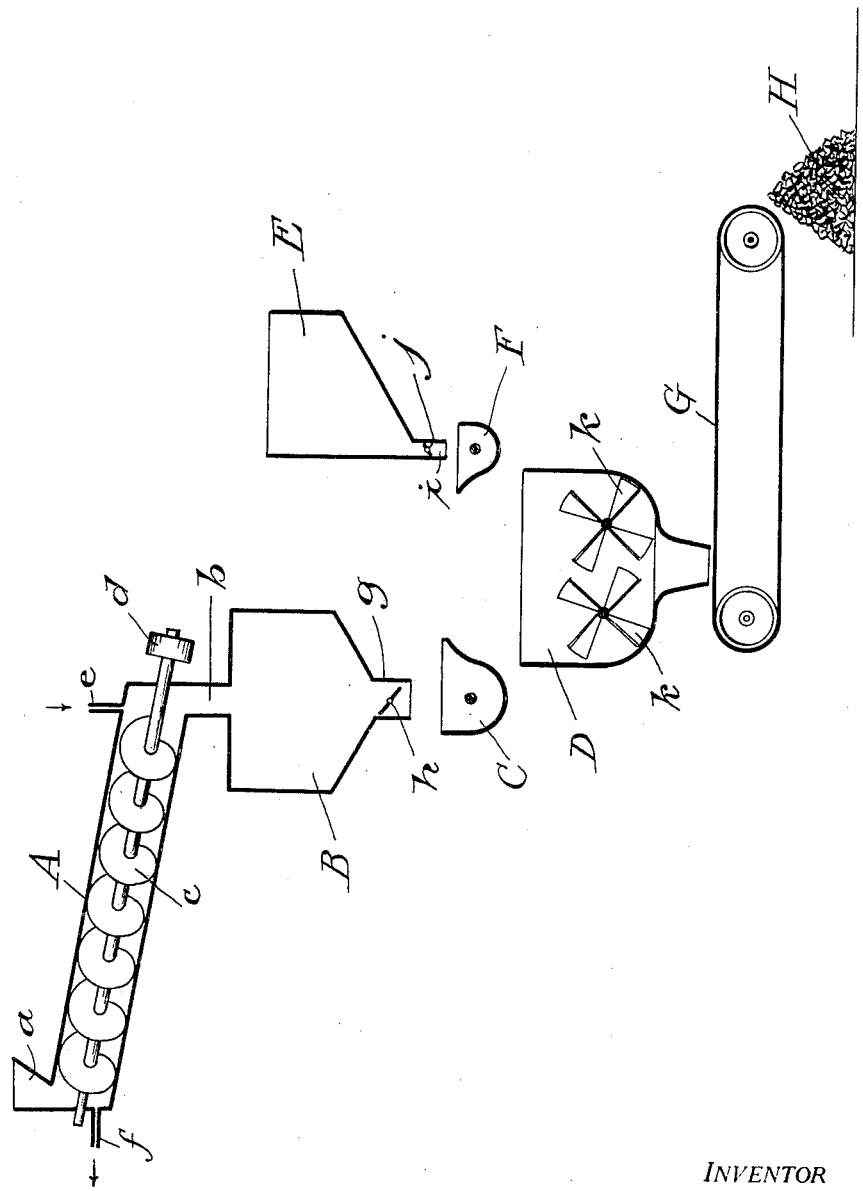
WITNESSES:
INVENTOR
James A. W. Pine.
BY
Jas. H. Griffin
Attorneys

UNITED STATES PATENT OFFICE.

JAMES A. W. PINE, OF NEW YORK, N. Y., ASSIGNOR, BY MESNE ASSIGNMENTS, TO BLACKSTONE INTERNATIONAL CORPORATION, A CORPORATION OF MAINE.

PROCESS OF COATING MINERAL MATERIAL AND PRODUCT RESULTING THEREFROM.

1,343,680.     Specification of Letters Patent.     Patented June 15, 1920.

Application filed July 1, 1915. Serial No. 37,541.

*To all whom it may concern:*

Be it known that I, JAMES A. W. PINE, a citizen of the United States, residing in the city of New York, borough of Bronx, county of Bronx, and State of New York, have invented a certain new and useful Process of Coating Mineral Material and Product Resulting Therefrom, of which the following is a specification.

This invention is a process of coating crushed stone, gravel, sand, clay, marble dust, crushed slag, shell marl, ashes, and other mineral materials, or any mixture of said materials, hereinafter referred to as a mineral agent or substance, with bitumen, or bituminous material, whereby the same is rendered suitable for road surfacing, bituminous concretes for street asphalt paving or "binder" as used on city streets, and for various analogous purposes.

A salient advantage of the present invention resides in the fact that the mineral material may be treated in large quantities, under favorable conditions, at a quarry, mine, or other suitable source of raw material, and particularly at a point convenient for shipment, whence it may be shipped, when convenient, to the various localities where it is to be used. A basic material is thus prepared in large quantities, in practically a condition for direct use, and in an economical manner, thereby obviating the many disadvantages incident to the methods now in use, of treating and preparing the material in small quantities, and by expensive and cumbersome methods, in the vicinity of or at the particular location where said material is to be used, *i. e., in situ.*

The mineral material, such as crushed stone, is uniformly coated with a very thin film or lamina of bitumen of such melting point and penetration that no appreciable adhesion results between the different particles or portions of material coated, but, on the other hand, they retain their unitary distinctiveness, except that they are coated as specified. This new product, prepared as described because of the minimum quantity of bitumen employed in the coating operation, is essentially distinctive in its physical characteristics, and can be readily distinguished, from any similar product heretofore made as it can be handled and shipped without seriously aggregating, and, as will appear from the hereinafter detailed description, possesses pronounced advantages for its intended uses.

A description will now be given of the preferred method of practising the invention, but it will be understood that the same is not limited to the specific procedure outlined.

In the accompanying drawing I have illustrated, diagrammatically, one form of apparatus which I have found useful in practising the invention, but said apparatus is illustrative, only, since it will be manifest that the process may be carried out in various other forms of apparatus.

Referring to the drawings, A is a drier or heater having an inlet hopper *a* for the granulated, mineral material, and an outlet (*b*) for the dried material. The drier is provided with a conveyer *c* which may be operated through pulley *d*. An inlet for hot air is provided at *e*, and an exit for the moist air at *f*, which may, if desired, be connected with a suitable exhaust. Outlet *b* from drier A leads to a storage bin B which has an outlet *g*, controlled by valve *h*, leading to a suitable measuring receptacle C, the contents of which may be dumped into a mixer D.

A tank E is provided for holding liquefied bitumen, or bituminous cement, said tank having an outlet *i*, controlled by valve *j*, leading to a bitumen measuring receptacle F, the contents of which may be also dumped into mixer D.

The mixer D is provided with agitators *k, k*, whereby the mineral material is brought into intimate and thorough contact with the bitumen, and each particle or globule of said material given a thin coating or pellicle of the bitumen. If desired, this mixing, in order to effect the desired coating, may be carried out manually, although it can be accomplished more efficiently by machinery. The mineral material having been coated as described is dropped on to a belt or other suitable conveyer G, and carried to any desired place of deposit, such as dump H. It may be cooled, if desired, in transit, by air or water.

Having described one type of apparatus which may be used in practising the invention, I will now describe in detail the particular manner in which the process is carried out.

The mineral material to be coated, if not of suitable fineness, is first crushed and properly graded as to size of particles, these being well known operations, whereupon it is fed, of any grading desired, through hopper $a$ to drier A, wherein it is dried by the current of hot air passing through said drier in a direction opposite to the feed of the material. The temperature at which the drying is effected may range from 300 to 500 degrees F. The dried material passes through outlet $b$ to storage bin B, whence it may be drawn off, in predetermined, measured quantities, into measuring receptacle C, from which it is dumped into mixer D. The heated bitumen contained in tank E, is fed to the bitumen measuring receptacle F, whereby a predetermined quantity may be dumped into mixer D. The quantity of bitumen employed may vary from $1\frac{1}{2}$ to 10%, depending on the character and fineness of the material operated upon, and its temperature may range from 250 to 400 degrees F, but it is preferable to employ a temperature of from 300 to 350 degrees F. As previously stated, the foregoing mixing operation may be effected by hand.

Just prior to adding the hot bituminous cement to the mineral material, it has been found desirable to cause said cement to "froth", *i. e.*, to foam or assume a frothy condition, and this effect is secured by adding thereto a small quantity of water, say one pint or so to every ten gallons of the cement. The result of this operation, due, mainly, to the vaporization of the water, is to attenuate the bitumen and thereby permit of its being deposited on the mineral particles or globules as an exceedingly thin film or coating. This operation enables the desired thin coating to be accomplished so successfully, that tests establish that a mixture containing from $\frac{3}{4}$ to $\frac{1}{4}$ stone may be properly coated by using 2%, by weight, of the bituminous cement. The finer the material treated, the larger the quantity of cement required, and, in the case of sand, *e. g.*, about 4% of the cement, by weight, is necessary.

The mineral material having been treated as described, the coated product is allowed to cool, and there results a water repellent body of distinct particles or pieces, unaffected at ordinary temperatures, or other atmospheric conditions, which can be readily handled, shipped, or stocked, without the globules or particles seriously cementing or sticking; in other words, the coating is so thin and firm that there is little or no tendency, under ordinary conditions of storing, or handling, of adhesion between the separate globules.

By bituminous cement, as the term has hereinbefore been used, is meant natural asphalt, coal tar pitch, residues of petroleum distillation having an asphaltic base, or any water-proof, cementitious pitch, solid cement, of mineral, vegetable or animal origin, all of which may be classified under the generic term hydrocarbons.

The particular "penetration" of the bituminous or asphaltic cement which has been found to be most suitable in applying the present invention, or in the practical application of the present invention, ranges from 30 to 50 on the scale of the well-known "Dow" machine, commonly employed for ascertaining the penetration of bodies of the character under consideration.

On the work, the previously treated mineral material, coated as described, is placed in a suitable mixing device, and a certain percentage of asphaltic cement, of rather high penetration, heated to from 300 to 350 degrees F., and which has been caused to "foam" by adding a small quantity of water, or by the injection of steam into the bucket containing it, is poured, preferably in a state of ebullition, over the coated material.

The addition of 5% of asphaltic cement, of 110 penetration, to stone coated with 2% of asphaltic cement, of 40 penetration, produces a bituminous concrete containing 7% of soluble bitumen, having a penetration of about 90. This product is suitable for most climatic conditions, including those of New York, Chicago, Omaha, and San Francisco, but, it will be understood that the percentage composition, as well as the degree of penetration, may be varied to meet any climatic requirement. I provide, also, for the further addition of any desired percentage of mineral dust, of from 100 to 200 mesh, upon which latter depends, to a vital degree, the density, durability, and general success of pavements, it having been found that from 10 to 20% of such dust is desirable where the pavement is used for heavy traffic. Sand mixtures usually require from 10 to 11% of bituminous cement to produce the desired thorough coating, and secure the thorough density under customary traffic conditions.

It will have been noted that the coated mineral material is prepared at a central plant under conditions which permit of its most economical treatment, such as the manipulation of the raw material with a minimum amount of handling, the continuous operation of the plant night and day during the entire year, and the finished material being carried in stock in large quantities, which can be expeditiously transported in bulk, to a desired location, under most favorable traffic conditions. Moreover, the resulting product is far more uniform than it is possible to produce when the operations are conducted by different people, working on small quantities of material, and under adverse conditions. The present method eliminates from 75 to 90% of the special machinery and skilled labor, now necessary at the locations where the material is used, and, further, dispenses with the setting up and operation of the complicated, cumbersome and expensive plants now required in laying hot paving mixtures, as well as dispensing with the corps of skilled operators usually employed.

After the mineral globules have been coated, as described, they may, without any cooling, other than that incident to the normal handling of the same, be piled up in bins or in exposed condition without occasioning any serious aggregating of the individual globules with one another.

The discovery of the greatly increased covering or coating capacity of bitumen, when applied to the mineral material in a foaming condition, is a most valuable one in the paving art, both from an economical and practical standpoint. Moreover, the further discovery that bitumens of variable penetrations, the softening points of which range from 100 to 120 degrees F., will fuse, when subjected to kneading or pressure, even at atmospheric temperatures, i. e., sun heat, is an important feature of my process in the subsequent use of the coated mineral material.

In cold weather, or at other times, whenever desired, a small percentage of volatile solvent may be added to the hot bituminous cement for the purpose of assisting in spreading the bitumen, used in the recoating of the mineral material on the work, and help in effecting the desired fusion.

In some cases it is found desirable to add a proportion of fine mineral dust, from 100 to 200 mesh, in which event it is preferable to first wet down the mineral dust with volatile solvent, or petroleum residuum, or both, just prior to its addition to the mixture. Any volatile solvent, capable of dissolving or emulsifying bitumen, may be used, but I find it preferable to use the light distillates or residues of petroleums, coal tar, or water gas tar. The distillates from asphaltic petroleums are preferred to those obtained from petroleums having a paraffin base.

Another procedure which, in some cases is advantageous, is to lay or spread the pre-coated material, suitably graded, in place, add the hot, frothing bitumen, and finish with a top dressing of mineral dust, stone, or other screenings.

In lieu of, or in conjunction with, the mineral materials heretofore referred to as capable of being used in practising my process, I may use coal ashes, a porous and economical by-product.

The pavement, resulting from any of the foregoing methods, is of a non-conducting character, both as to heat and sound, and possesses inherent mobility.

Application of the coated mineral product, other than those described, will be readily apparent to those skilled in the art, as will also be the fact that the processes outlined may be modified in details without departing from the spirit or purpose of my invention.

The inherent mobility which is common to all bituminous concretes is reduced to the lowest minimum by applying the bitumen in an attenuated form, thus providing the maximum stability possible in such concretes. It is desired to lay special emphasis on the extremely thin film, or pellicle, of bitumen which is applied to the stone, thereby producing a distinctly novel and meritorious product.

Having thus fully described the invention, what I claim as new, and desire to secure by Letters Patent, is:—

1. In the art of paving, the process of coating globules of mineral matter with a thin film of bituminous cement, which consists in separately heating the mineral matter and cement, then attenuating the cement and then mixing it with the heated mineral matter while the latter is being agitated.

2. In the art of paving, the process of coating globules of mineral matter with a thin film of bituminous cement, which consists in separately heating the mineral matter and cement, then attenuating the cement by means of an aqueous agent, and then mixing it with the heated mineral matter while the latter is being agitated.

3. In the art of paving, the process which consists in heating mineral globules, and then mixing with them, under agitation, hot, attenuated bituminous cement in minimum quantity, the proportion of cement employed being not over 5%, by weight, of the mineral globules thus treated.

4. In the art of paving, the process which consists in heating mineral globules, and then mixing with them, under agitation, hot, attenuated bituminous cement in minimum quantity, the proportion of cement employed being less than 3%, by weight, of the mineral globules thus treated.

5. In the art of paving, the process which consists in heating mineral globules, then applying thereto, under agitation, a pellicle of hot, bituminous attenuated cement in minimum quantity, allowing the same to cool and subsequently mixing therewith an additional quantity of hot bituminous cement.

6. In the art of paving, the process which consists in heating mineral particles, then applying thereto, under agitation, a thin coat or pellicle of attenuated bitumen, allowing the mixture to cool and subsequently mixing therewith a quantity of hot asphaltic cement of higher penetration than that of the bitumen employed in the coating operation.

7. In the art of paving, the process which consists in heating mineral particles, and in applying thereto, while under agitation, a thin coat or pellicle of bitumen, allowing the same to cool and subsequently mixing therewith, while under agitation, a further quantity of hot bituminous cement which has been attenuated by means of an aqueous agent.

8. In the art of paving, the process which consists in heating mineral particles and in applying thereto, while under agitation, a thin coat or pellicle of bitumen, allowing the mixture to cool, mixing therewith a further quantity of hot bituminous cement and then adding mineral dust.

9. In the art of paving, the process which consists in applying a thin coat or pellicle of bituminous cement to mineral globules, allowing the same to cool, mixing therewith a further quantity of hot bituminous cement, and then adding mineral dust containing a small quantity of a volatile solvent of the bituminous cement.

10. In the art of paving, a new article of commerce embodying mineral globules or particles coated with a pellicle or lamina of bituminous cement of minimum thickness, whereby the product is capable of being handled and shipped without aggregating seriously.

11. In the art of paving, a new article of commerce embodying mineral globules or particles coated with a pellicle or lamina of bituminous cement applied in an attenuated condition.

12. In the art of paving, a new article of commerce embodying mineral globules adapted for road surfacing, having a thin, minimum coating of bituminous cement of such degree of penetration that the coated particles are substantially unadhesive under ordinary atmospheric conditions and may be handled and shipped in such condition without seriously aggregating.

13. In the art of paving, a new article of commerce embodying mineral particles adapted for road surfacing coated with bituminous cement, the proportion of said bituminous cement employed being less than 5%, by weight, of the mineral particles, whereby the said product may be shipped and handled without becoming seriously aggregated.

14. In the art of paving, a new article of manufacture and commerce embodying mineral globules coated with bituminous cement, the proportion of said bituminous cement being not over 3%, by weight, of the mineral globules.

In testimony whereof I have signed my name to this specification in the presence of a subscribing witness.

JAMES A. W. PINE.

Witness:
G. REEL.